Sept. 13, 1932. A. RINNE 1,877,533
CARBURETOR CONTROL
Filed Dec. 7, 1929 3 Sheets-Sheet 1

Inventor
Allan Rinne

By Clarence A. O'Brien
Attorney

Sept. 13, 1932.  A. RINNE  1,877,533
CARBURETOR CONTROL
Filed Dec. 7, 1929   3 Sheets-Sheet 2
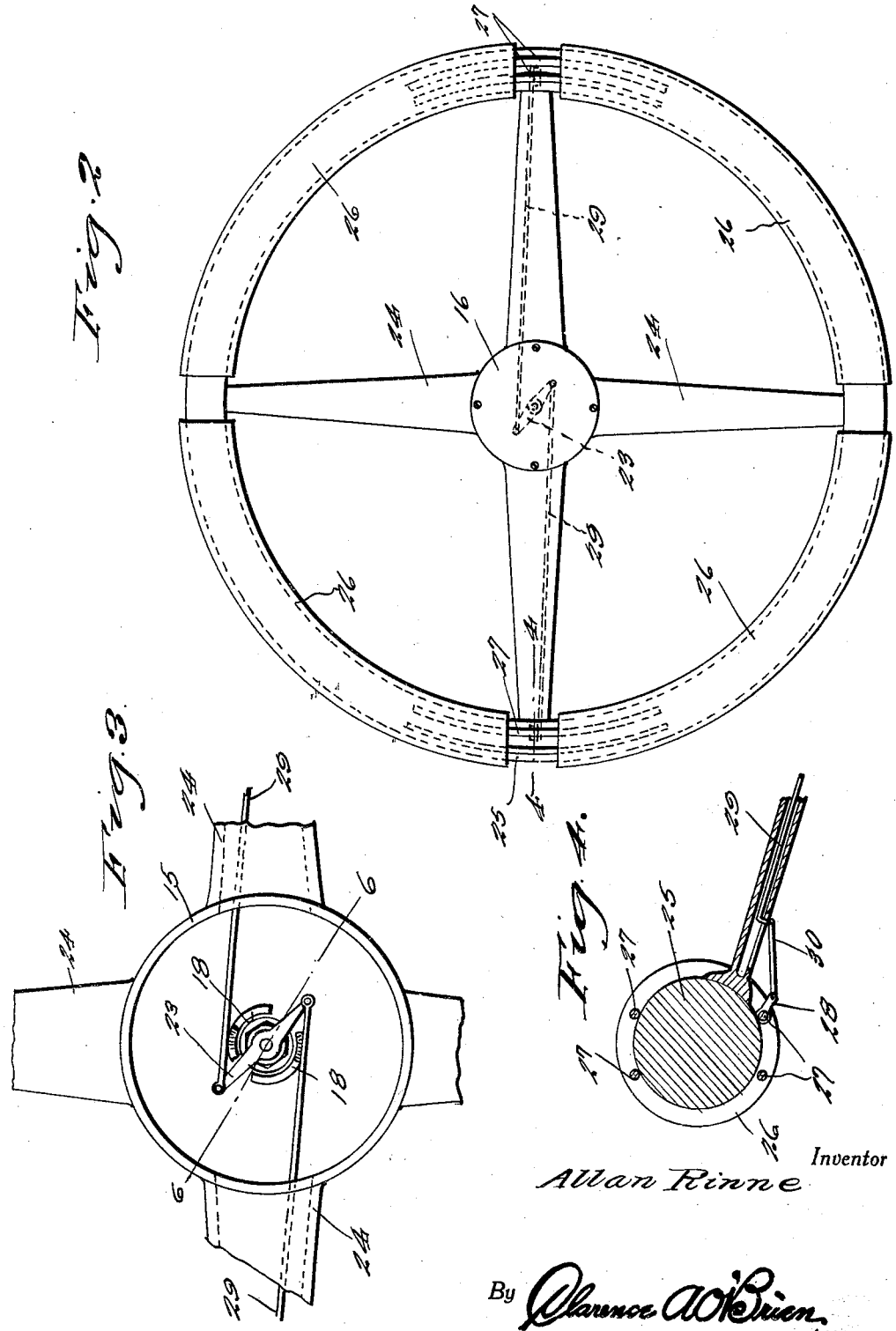
Inventor
Allan Rinne
By Clarence A. O'Brien
Attorney

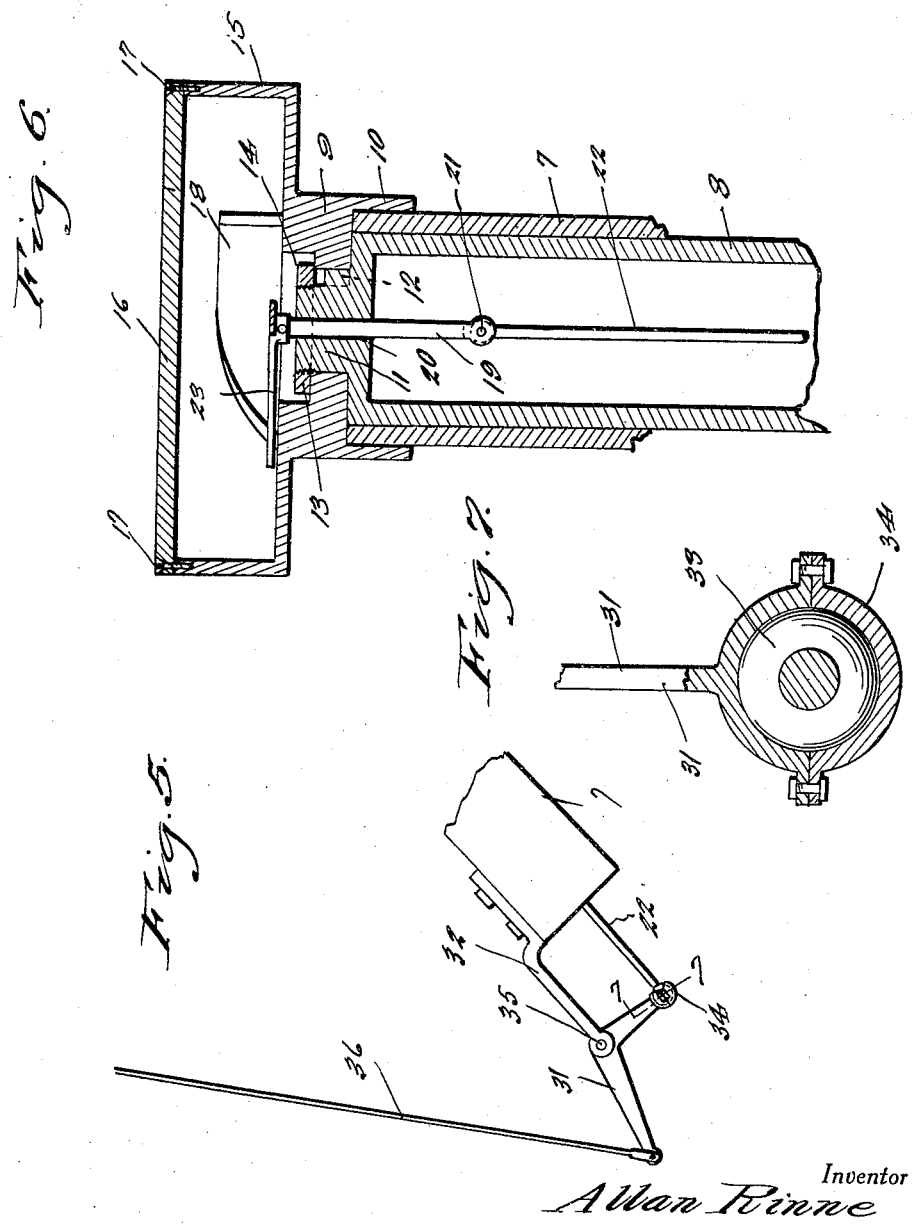

Patented Sept. 13, 1932

1,877,533

UNITED STATES PATENT OFFICE

ALLAN RINNE, OF ORR, MINNESOTA

CARBURETOR CONTROL

Application filed December 7, 1929. Serial No. 412,535.

This invention appertains to new and useful improvements in accelerators, and it is an improvement over my co-pending application, Serial No. 407,147, filed November 14, 1929 and patented June 2, 1931, No. 1,807,706.

The principal object of this invention is to provide an accelerator control of marked simplicity, yet of extreme durability and positive acting in operation.

Another important object of the invention is to provide an accelerator which can be controlled without removing the hands from the steering wheel.

These and numerous other important objects and advantages of the invention will become more apparent to the reader after considering the invention as described and claimed in hereinafter.

In the drawings:—

Fig. 2 is a top plan view of the improved steering wheel.

Fig. 3 represents a fragmentary top plan view of the steering wheel hub showing the cap thereof removed.

Fig. 4 is a fragmentary sectional view taken substantially on the line 4—4 of Fig. 2.

Fig. 5 is a fragmentary side elevational view.

Fig. 6 represents a fragmentary vertical sectional view taken substantially on the line 6—6 of Fig. 3.

Fig. 7 is a sectional view taken substantially on the line 7—7 of Fig. 5.

Figure 1:
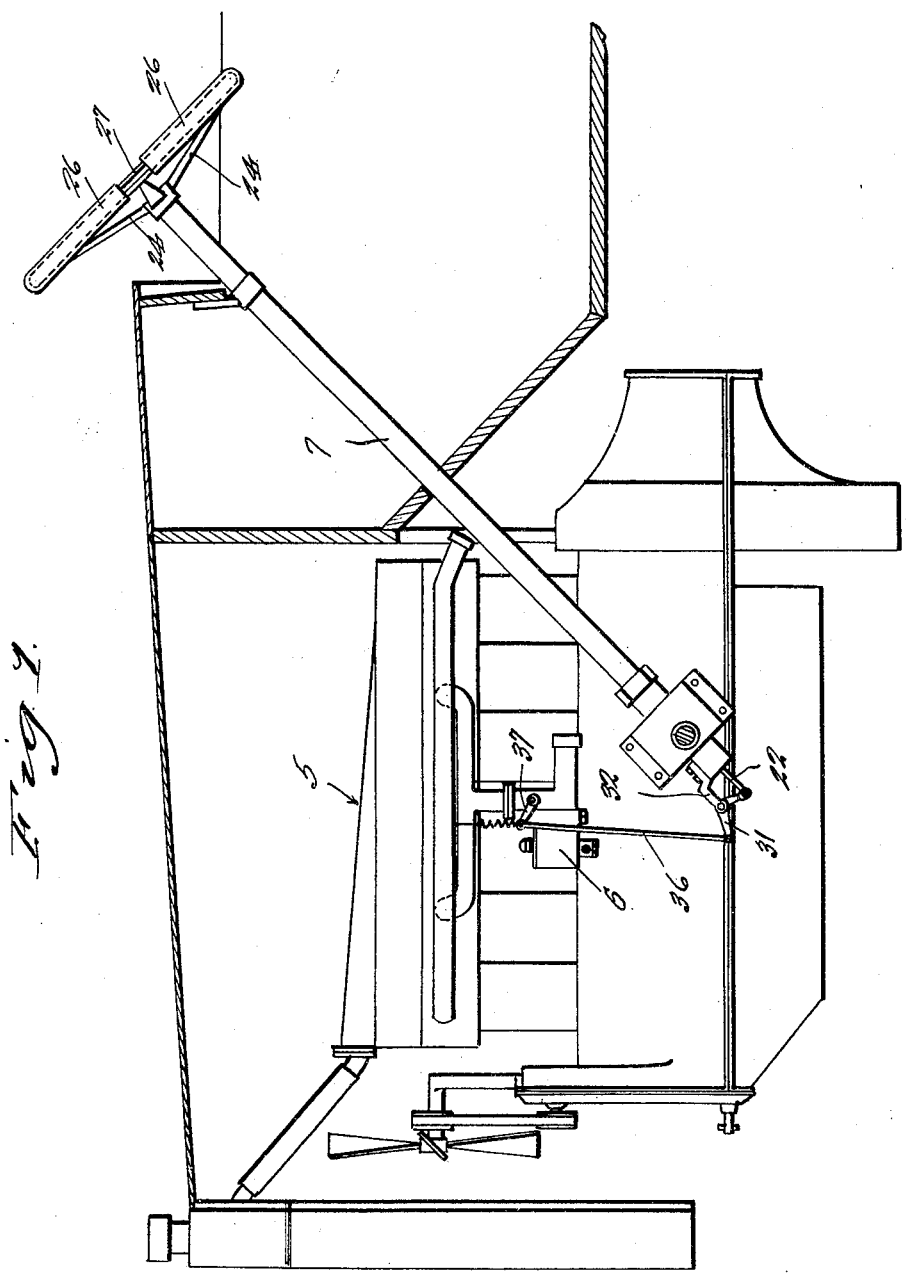
Figure 1 represents a fragmentary sectional view through the forward portion of an automobile, showing in side elevation the improved steering wheel and the connection between the steering wheel and the throttle valve of the carburetor.

Referring to the drawings wherein like numerals designate like parts, it can be seen in Fig. 1, that numeral 5 generally refers to the internal combustion engine and numeral 6 denotes the usual carburetor. The steering shaft housing is designated by numeral 7 and through this is disposed the usual hollow steering shaft 8 (see Fig. 6).

At the upper end of the housing 7, there is a hub structure 9 which has a skirt 10 for engaging over the upper end of the housing 7. This hub 9 is keyed to the shank 11 of the shaft 8 as at 12, and this shank 11 is threaded at its upper end for engagement within the nut 13, which nut is disposed within the recess 14 at the top side of the hub 9.

The hub 9 is secured to the bottom of the circular shell 15 which has a removable cover plate 16, capable of being secured to the shell 15 by screws 17.

Mounted upon the bottom of the shell 15 are the arcuate-shaped cams 18—18, arranged in a circular disposition substantially concentric with respect to the longitudinal axis of the shaft 8.

As is clearly shown in Fig. 6, a stem 19 is rotatably and slidably disposed through a bore 20 in the shank 11, and the lower end of this stem 19 is pivotally connected as at 21 to the upper end of the connecting rod 22. The upper end of the stem 19 is secured to the intermediate portion of a rocker arm 23, the end portions of which are engageable with the cams 18—18.

In Figs. 2 and 4, the construction of the novel steering wheel is shown, and this is substantially as shown and described in my before mentioned patent. Briefly, this steering wheel structure comprises spokes 24 radiating from the hub 9 and connected to the rim 25 above the wheel. Sleeves 26 are arranged on the rim between the spokes and preferably number four.

Certain of the sleeves 26 have their opposed ends connected by rods 27. As is clearly shown in Fig. 2, a pair of these rods, one at a pair of diametrically opposite sides on the wheel, are provided with bell cranks 28, connected at their free ends to rods 29 through the agency of pivotal links 30. These rods 29 extend through certain of the spokes 24 which are hollow and connect from the rocker arms 23. Thus in place of the rheostat shown and described in my patent, mechanical means is provided for operating the accelerator.

This is accomplished by connecting the lower end of the rod 22, to the rocker arm 31, which arm is supported by the bracket 32 at the lower end of the steering shaft housing 7. As is clearly shown in Fig. 7, the rod 22 is equipped with a ball 33 which is engaged within the sectional socket 34 provided at one end of the rocker arm 31.

As is clearly shown in Fig. 5, this rocker arm is pivoted to the bracket 32 as at 35. The opposite end of the rocker arm has an elongated rod 36 pivotally secured thereto at its lower end, while its upper end is pivotally connected to the lever 37, which is in turn connected to the throttle valve of the carburetor 6.

It will thus be seen that when a twisting motion is imparted to the sleeve 26, the bell crank 28 will be operated so as to swing the rocker arm 23. The arm riding on the cams 18—18 will elevate the connecting rod 22 and this in turn will exert a pull on the rocker arm 31. Thus motion is imparted to the rod 36, which in turn actuates the throttle valve of the carburetor.

A device of this simple nature can be manufactured at a very reasonable cost, and while the foregoing description has been in specific terms, it is to be understood that changes within the scope of the appended claim, may be resorted to in the manufacture of the mechanism.

Having thus described my invention, what I claim as new is:—

In combination with a motor vehicle including a steering column, the steering wheel at the upper end of the column and the throttle valve, a sectional sleeve movably arranged on the rim of the wheel for rotary movement, a shaft extending through the upper end of the column, an arm connected at the center to the upper end of the shaft, a pair of oppositely arranged cams on the hub of the wheel for engagement by the ends of the arm when the arm is moved from a neutral position between the cams, links having their inner ends connected to the ends of the arm and passing through some of the spokes of the wheel and having their outer ends connected with parts of the sleeve, and means for connecting the lower end of the shaft to the throttle valve.

In testimony whereof I affix my signature.

ALLAN RINNE.